United States Patent
Ishiyama

[11] Patent Number: 6,040,642
[45] Date of Patent: Mar. 21, 2000

[54] LINEAR MOTOR EQUIPPED WITH A STATOR WHICH IS EASILY ASSEMBLED

[75] Inventor: Noritaka Ishiyama, Inagi, Japan

[73] Assignee: GMC Co., Ltd., Kawasaki, Japan

[21] Appl. No.: 09/075,872

[22] Filed: May 12, 1998

[30] Foreign Application Priority Data

May 12, 1997 [JP] Japan .................. 9-120830

[51] Int. Cl.[7] ............................... H02K 41/00
[52] U.S. Cl. ...................................... 310/12
[58] Field of Search .................. 310/12, 13, 14

[56] References Cited

FOREIGN PATENT DOCUMENTS

| 0 280 743 | 9/1988 | European Pat. Off. . |
| 0 774 826 | 5/1997 | European Pat. Off. . |
| 1 135 765 | 12/1968 | United Kingdom . |
| 2 079 068 | 1/1982 | United Kingdom . |

OTHER PUBLICATIONS

Masami; "Stator of Linear Pulse Motor"; Patent Abstracts of Japan; vol. 010, No. 352; Publication No. 61150661; Publication Date: Jul. 9, 1986.

*Primary Examiner*—Nestor Ramirez
*Assistant Examiner*—Judson H. Jones
*Attorney, Agent, or Firm*—Foley & Lardner

[57] ABSTRACT

A stator in a linear motor includes a plurality of cylindrical permanent magnets and a center shaft made of non-magnetic material and inserted in the permanent magnets. The permanent magnets are tightened from both sides thereof so that the adjacent permanent magnets may be close to each other.

3 Claims, 5 Drawing Sheets

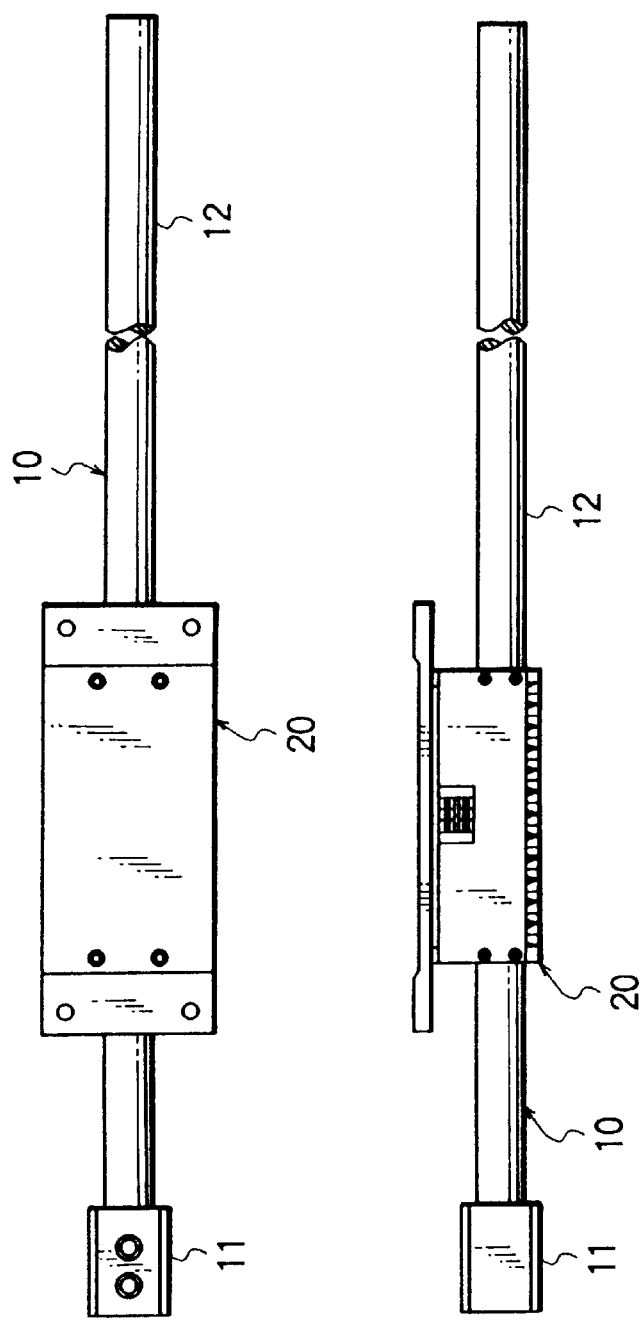
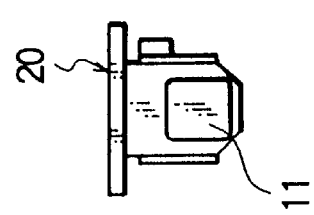
FIG. 2
FIG. 3
FIG. 4

WIRING

4 PARALLEL ROWS IN EACH PHASE

LINEAR MOTOR EQUIPPED WITH A STATOR WHICH IS EASILY ASSEMBLED

BACKGROUND OF THE INVENTION

The present invention relates to a linear motor, particularly to an improvement in a stator which is constructed by combining a plurality of permanent magnets.

Recently, in the field of office automation apparatus, it has been proposed to utilize a linear motor at a part such as a printing head which is required to be linearly moved. Generally, the linear motor has a stator in which a plurality of permanent magnets are combined in series so that their opposite magnetic poles may face to each other, and a movable part which is disposed outside the stator so as to surround the stator and which includes a coil capable of sliding in the axial direction of the stator. When electric current is allowed to flow through the coil so as to intersect magnetic flux generated from the permanent magnets, drive force acts on the coil in its axial direction due to an interaction between the electric current and the magnetic flux. As a result, the movable part is moved.

In such a linear motor, the positioning accuracy of the movable part is affected by the assembling accuracy of the plurality of permanent magnets in the stator. Hitherto, the plurality of permanent magnets are fixed to a bar-shaped supporting member by adhesion as described later in detail.

When such adhesion is performed, large repulsion force acts between adjacent permanent magnets. Thus, the permanent magnets must be kept held with a jig until adhesive is completely solidified. This means that a manufacturing process of the stator requires a time duration for solidifying the adhesive and position deviations of the permanent magnets are apt to occur.

SUMMARY OF THE INVENTION

Accordingly, it is an object of the present invention to provide a linear motor equipped with a stator in which a plurality of permanent magnets are assembled without adhesion.

It is another object of the present invention to provide a linear motor equipped with a stator in which a plurality of permanent magnets are assembled with high accuracy.

It is still another object of the present invention to provide a linear motor equipped with a stator which can easily be assembled and which is inexpensive.

A linear motor according to the present invention includes a stator which is constructed by assembling a plurality of permanent magnets in series so that their opposite magnetic poles may face to each other.

According to an aspect of the present invention, each permanent magnet has a cylindrical base shape. The stator includes a center shaft of non-magnetic material inserted in the plurality of permanent magnets. The plurality of permanent magnets are tightened from both sides thereof so that the adjacent permanent magnets may be close to each other.

BRIEF DESCRIPTION OF DRAWINGS

FIG. 2 is a plan view of a linear motor according to a preferred embodiment of the present invention;

FIG. 3 is a front view of the linear motor of FIG. 2;

FIG. 4 is a side view of the linear motor of FIG. 2;

DETAILED DESCRIPTION OF PREFERRED EMBODIMENTS

Figure 1:
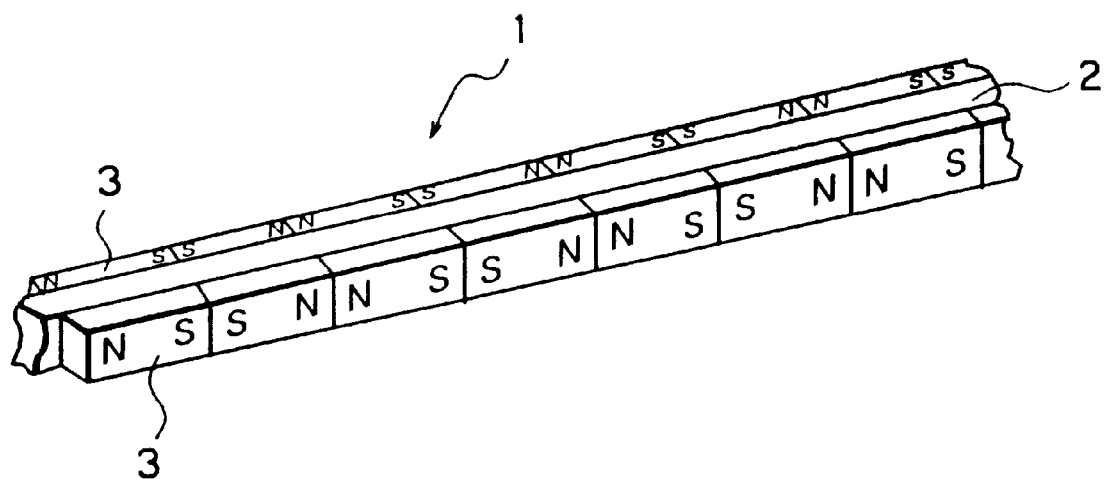
FIG. 1 is a schematic view of a stator in a prior art linear motor.

For easily understanding the present invention, a stator in a prior art linear motor will be described with reference to FIG. 1. In FIG. 1, a stator 1 includes a bar-shaped supporting member 2 made of non-magnetic material and block-shaped permanent magnets 3. The permanent magnets 3 are disposed in series on both sides of the supporting member 2 and mounted to each other with adhesion so that their opposite magnetic poles face to each other. In the case of office automation apparatus, the length of each permanent magnet 3 is in the extent of several cm. The length of the stator 1 is less than 1 m. Therefore, more than scores of permanent magnets 3 must be adhered to the supporting member 2.

When such adhesion is performed, there is large repulsion force acts between the adjacent permanent magnets 3. Thus, the permanent magnets 3 must be held with a jig until the adhesive is completely solidified. The process of manufacturing the stator 1 thus requires a time duration for completely solidifying the adhesive and position deviations of the permanent magnets 3 are apt to occur before the adhesive is solidified.

Hereinafter, a linear motor according to a preferred embodiment of the present invention will be described with reference to FIGS. 2 to 7. In FIGS. 2 to 4, a linear motor according to this embodiment includes a stator 10 and a movable part 20. The stator 10 includes a bracket 11 made of non-magnetic material and a pipe 12 made of non-magnetic material and including a large number of permanent magnets, as described later in detail.

Figure 6:
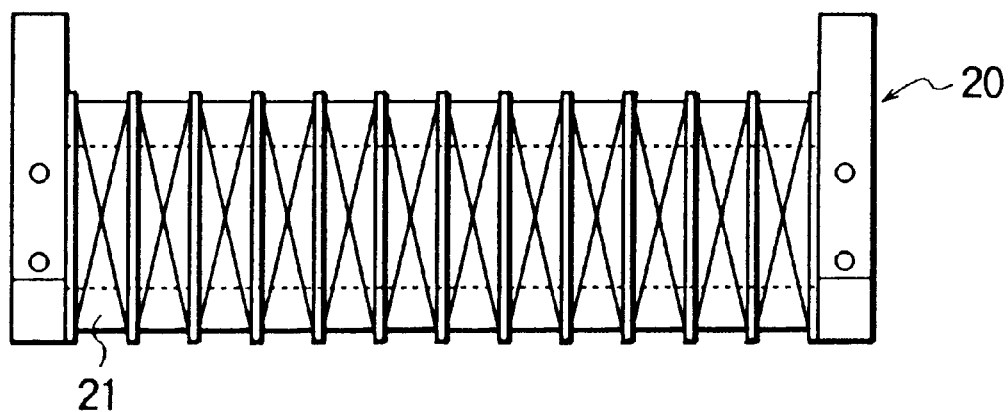
FIG. 6 is a side view of a movable part shown in FIG. 2.
Figure 7:
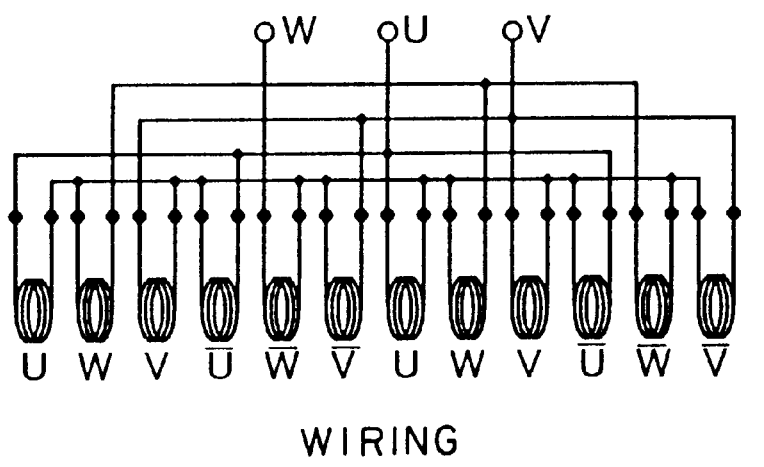
FIG. 7 is a view of an instance of the connecting manner of coils in the movable part of FIG. 6.

The movable part 20 has coils (here, twelve coils) 21 as shown in FIG. 6. The pipe 12 penetrates those coils 21. The movable part 20 can slide in the axial direction of the pipe 12 in contact or non-contact with the pipe 12. A three-phase alternating current source is connected to the twelve coils 21 and the coils 21 are connected to the phases W, U and V as shown in FIG. 7.

Figure 5:
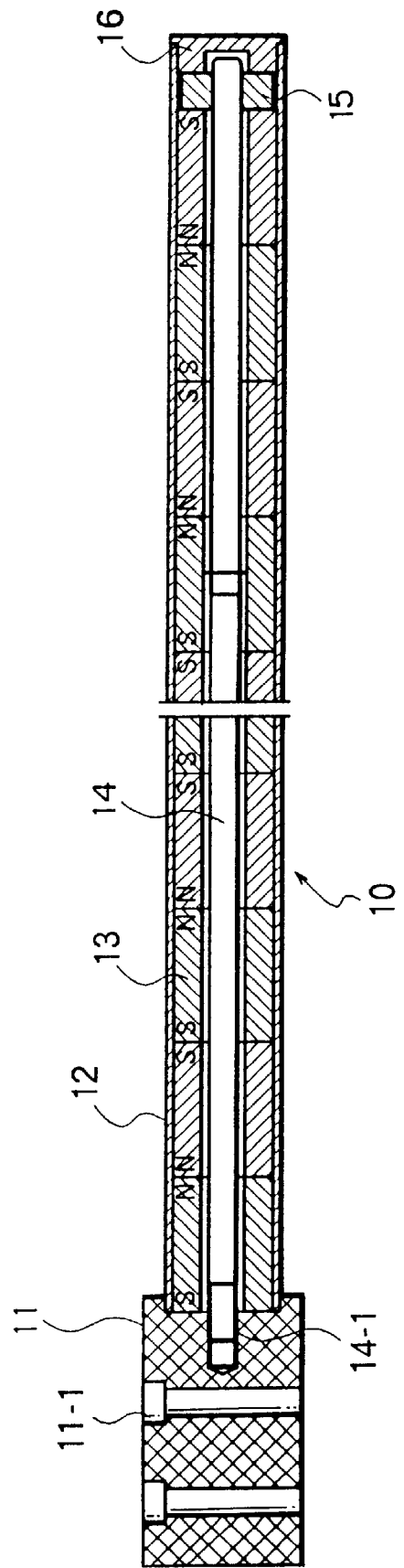
FIG. 5 is a cross-sectional view showing the construction of a stator in the linear motor of FIG. 2.

Next, the stator 10, which is the most characteristic part in the present invention, will be described with reference to FIG. 5. The stator 10 has cylindrical or ring-shaped permanent magnets 13, a center shaft 14 inserted in the permanent magnets 13, and a nut 15 for tightening in addition to the bracket 11 and the pipe 12. A male screw portion 14-1 is provided on one end portion of the center shaft 14. The male screw portion 14-1 is relatively screwed in a female screw portion provided in the bracket 11. Another male portion 14-2 having a predetermined length is provided on the other end side of the center shaft 14. The nut 15 is engaged with the male portion 14-2 so that the permanent magnets 13 are brought into close contact with each other between the bracket 11 and the nut 15. The permanent magnets 13 are disposed in series so that those opposite magnetic poles face to each other. The pipe 12 having a circular cross-section covers the outer peripheries of the permanent magnets 13. The bracket 11 is provided with holes 11-1 for inserting screws to mount the stator 10 to an apparatus in which this linear motor is equipped.

As material of the permanent magnets 13, rare-earth material or ferrite material having large magnetic flux density is preferable, but other magnetic material may be used.

For the pipe 12, any of non-magnetic materials such as aluminum, brass and stainless steel can be used. For the center shaft 14, non-magnetic material such as stainless steel is used. In particular, the center shaft 14 is designed to obtain sufficient mechanical strength for assembling the permanent magnets 13. In contrast to this, it is preferable that the pipe 12 is as thin as possible so as not to decrease the magnetic field acting on the movable part 20 which is disposed outside the pipe 12. For instance, the pipe 12 is made of stainless steel of 1 mm thickness. Besides, the pipe 12 has an inside diameter to be in close contact with the outer peripheries of the permanent magnets 13. The pipe 12 thus prevents the permanent magnets 13 from being rusted. The pipe 12 serves as a guide for the movable part 20 if the movable part 20 is slid in contact with the pipe 12.

Next, a method of assembling the stator 10 will be described. First, the male screw portion 14-1 of the center shaft 14 is relatively screwed in the female screw portion of the bracket 11. Next, the pipe 12 is disposed around the center shaft 14 and the permanent magnets 13 are put on the center shaft 14 one by one and inserted in the pipe 12. After a predetermined number of the permanent magnets 13 are inserted, the nut 15 is engaged with the male screw portion 14-2 and the permanent magnets 13 are tightened so that the adjacent permanent magnets 13 may be close to each other. In the case of the pipe 12 having a length longer than the total length of the predetermined number of the assembled permanent magnets 13 as shown in FIG. 5, the nut 15 must be turned in the pipe 12. In that case, the nut 15 can be turned with a specific jig. After assembling the predetermined number of the permanent magnets 13, the opening of the pipe 12 is closed with a cap 16.

Figure 8:
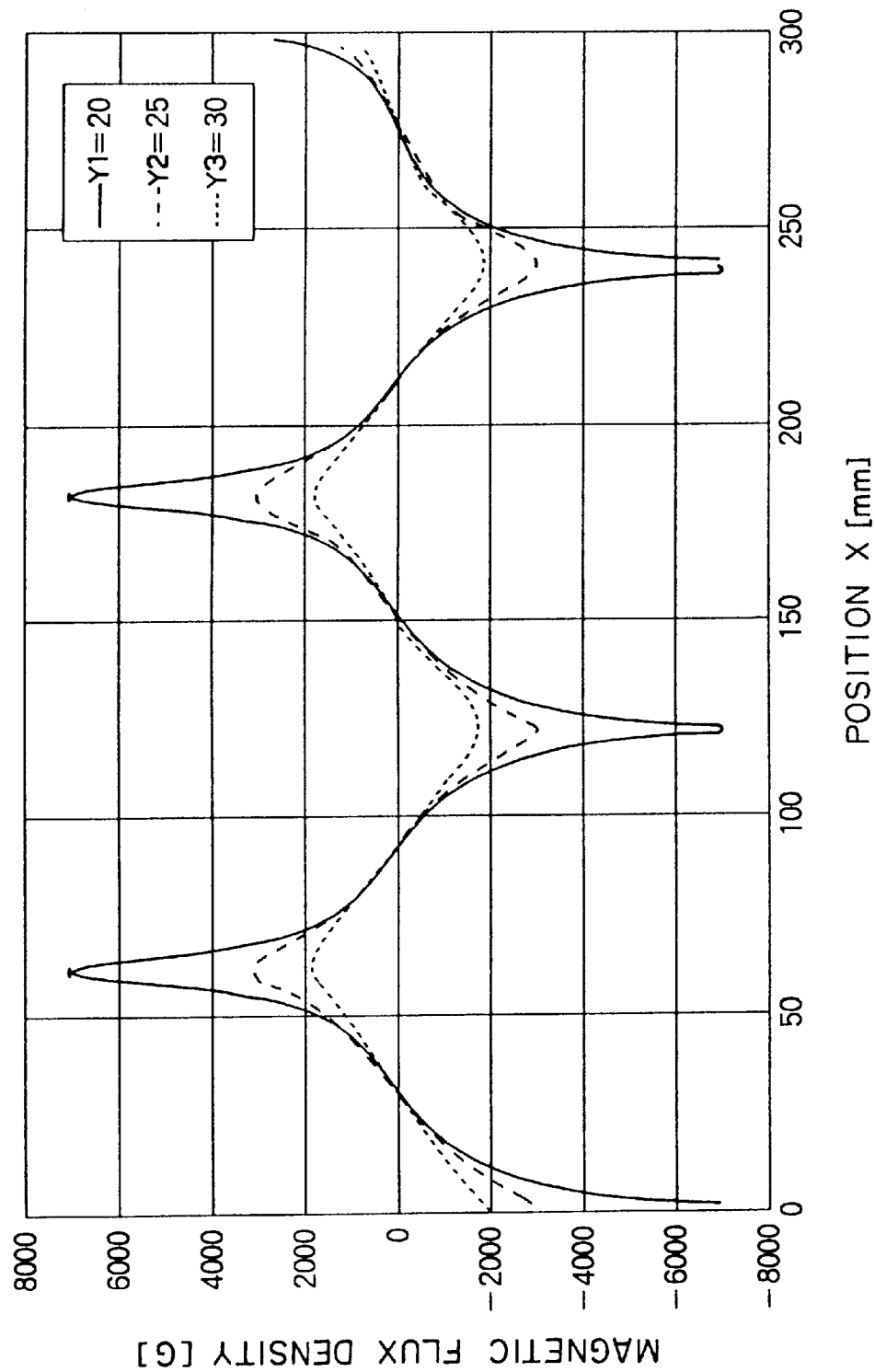
FIG. 8 is a graph showing a measurement result of magnetic flux density due to the stator of FIG. 5.

For reference, a measurement result of the magnetic flux density around the stator 10 is shown in FIG. 8. Each ring-shaped permanent magnet 13 had the outside diameter of 36.3 mm, the inside diameter of 16.3 mm and the length of 60 mm. Measurements of the magnetic flux density were performed at distances Y1=20 mm, Y2=25 mm and Y3=30 mm from the center shaft. Needless to say, the magnetic flux density has a peak at the connecting portion between two adjacent permanent magnets 13.

In the present invention, a stator having the length to the extent of about 2 m can be realized. The cross-sectional shape of each permanent magnet 13 is not limited to ring but may be polygonal. In any case, the pipe 12 must have the cross-sectional shape corresponding to that of each permanent magnet 13. Application of the linear motor according to the present invention is not limited to a relatively small-sized apparatus such as an office automation apparatus but the linear motor according to the present invention can also be applied to a part having need of linear movement in a large-sized industrial machine, for instance, to a transfer table in a large-sized machine tool such as a milling machine.

As described above, according to the present invention, since permanent magnets for constituting a stator in a linear motor can be assembled without adhesion, the following effects can be obtained.

A. Since the permanent magnets can be assembled merely by tightening, the construction of the stator and the process for assembling it are both simplified and an inexpensive linear motor can be provided.

B. Since there is no process of adhesion, no specific jig for holding the permanent magnets during adhesion and no time duration for completely solidifying the adhesive used are required. Assembling can thus be performed in a short time duration.

C. Since position errors of the permanent magnets do not occur, the permanent magnets can be disposed as designed and the positioning accuracy of the movable part can thus be improved.

What is claimed is:

1. A linear motor including a stator which comprises a plurality of permanent magnets assembled in series so that those opposite magnetic poles may face to each other, wherein each of the permanent magnets has a cylindrical base shape, the stator comprises a center shaft made of non-magnetic material and inserted in the plurality of permanent magnets, and the plurality of permanent magnets are tightened from both sides thereof so that the adjacent permanent magnets may be close to each other, wherein the stator ftnther comprises a tubular member made of non-magnetic material and covering the outer peripheries of the plurality of permanent magnets, wherein the stator further comprises a bracket provided with a female screw portion, a male screw portion provided on one end portion of the center shaft is relatively screwed in the female screw portion of the bracket, another male screw portion having a predetermined length is provided on the other end side of the center shaft, and a nut is engaged with the male screw portion on the other end side so that the permanent magnets are brought into close contact with each other between the nut and the bracket.

2. A linear motor as claimed in claim 1, wherein each of the permanent magnets is ring-shaped, and the tubular member is a pipe which can be brought into close contact with and fitted on the outer peripheries of the permanent magnets.

3. A linear motor as claimed in claim 2, wherein the permanent magnets are made of rare-earth material or ferrite magnetic material.

* * * * *